United States Patent Office 3,565,821
Patented Feb. 23, 1971

3,565,821
PROCESS FOR ACTIVATING
RHODIUM CATALYSTS
Aaron C. L. Su, Wilmington, Del., assignor to E. I. du
Pont de Nemours and Company, Wilmington, Del., a
corporation of Delaware
No Drawing. Filed Apr. 1, 1969, Ser. No. 812,298
Int. Cl. B01j *11/01, 11/80;* C07c *3/52, 3/60*
U.S. Cl. 252—415                                    12 Claims

ABSTRACT OF THE DISCLOSURE

A process for activating a rhodium catalyst which has become deactivated through use in synthesizing dienes from α-monoolefins and conjugated dienes in which the deactivated catalyst is treated with an active organic halide or chloride. A process is also provided for oxidizing rhodium (I) to rhodium (III).

BACKGROUND OF THE INVENTION

Nonconjugated hydrocarbon dienes are starting materials for valuable polymers such as α-monoolefin/nonconjugated diene copolymers. They can be prepared by codimerizing α-monoolefins, such as ethylene or propylene with conjugated hydrocarbon dienes, such as 1,3-butadiene, in the presence of a rhodium catalyst.

During the aforementioned process, the rhodium catalyst becomes deactivated to the point that it is ineffective for further use. Unless the catalyst is by some means reactivated, the process is economically unfeasible.

U.S. Patent 3,152,195 to Verbanc discloses reactivating rhodium catalysts used in the above-described process by adding hydrochloric acid and ethanol to the catalyst residue obtained after removal of the diene and before reuse of said catalyst.

Although reactivation with HCl has greatly improved the efficiency of the rhodium catalyst process, it has also led to some difficulties. The hydrochloric acid, especially in combination with methanol, is highly corrosive and requires the use of special glass lined reactors. Moreover, the lower alcohol which is preferably used in conjunction with HCl is difficult to separate from the product or recycle through the system.

There is a need, therefore, for a more effective method to reactivate rhodium catalysts used in the synthesis of 1,4-dienes.

SUMMARY OF THE INVENTION

This invention provides a process for activating rhodium catalyst which has become deactivated through use in codimerizing α-monoolefins and conjugated dienes to prepare 1,4-dienes, in which said rhodium catalyst is treated with about 1–500 gram-moles of an active organic halide or chlorine per gram-atom of rhodium present. A process is also provided for oxidizing rhodium metal in the (I) valence state to the (III) state.

DETAILED DESCRIPTION

The rhodium catalyzed α-monoolefin/conjugated diene reaction is carried out by techniques generally known in the art. Ethylene is the preferred monoolefin for use in this reaction as it is commercially available in large quantities at a low price and combines with a conjugated diene to give important 1,4-dienes such as 1,4-hexadiene. Other useful α-monoolefins include those having the formula Y—CH$_2$—CH=CH$_2$ where Y is hydrogen, C$_1$–C$_{15}$ alkyl or halogenated C$_1$–C$_{15}$ alkyl. Of this group the commercially available members having up to about 6 carbon atoms are preferred; propylene is the most preferred because of its availability and the importance of the dienes formed from it. A preferred halogenated α-monoolefin is 5,6-dibromo-1-hexene. Other examples of hydrocarbons and halogenated hydrocarbon α-monoolefins are given in U.S. Patent 3,222,330 to Nyce et al.

The conjugated dienes codimerizable with the α-monoolefins by means of rhodium catalysts are those having the formula

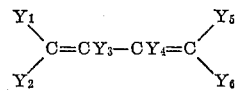

wherein $Y_1$ can be different from $Y_5$ and each can be tolyl, halophenyl, phenyl, alkyl, hydrogen, alkoxy or $Y_1$ and $Y_5$ can be joined together to form a cyclic diene containing up to 12 carbon atoms in the ring; $Y_2$ and $Y_6$ are individually alkyl or hydrogen and $Y_3$ and $Y_4$ are individually hydrogen, alkyl, aryl, alkaryl, aralkyl or halo. The preferred conjugated diene is 1,3-butadiene; it is commercially available in large quantities at an attractive price and when combined with ethylene, makes possible the preparation of 1,4-hexadiene. Other conjugated dienes which are codimerizable with α-monoolefins include isoprene, 1,3-pentadiene; 2,3 - dimethyl-1,3-butadiene; 2-chloro-1,3-butadiene; 2,3-dichloro - 1,3 - butadiene; 1-phenyl-1,3-butadiene; 1-phenyl - 1,3 - butadiene; 2-phenyl-1,3-butadiene; 1-p-tolyl-butadiene; 1,2-diphenyl-1,3-butadiene; 2,3-diphenyl-1,3-butadiene; 2-ethyl - 1 - phenyl-1,3-butadiene and 1-p-chlorophenyl-1,3-butadiene.

Although the rhodium catalyzed α-monoolefin-conjugated diene reaction involves the equimolecular addition of the monoolefin to the diene, it is not necessary to employ equimolar amounts of reactants. In typical batch operations the ratio of reactants can be continually changing. Both the α-monoolefin and the conjugated diene can be introduced into the reactor to establish a suitable value of the ratio before the reaction is initiated; thereafter, additional α-monoolefin is fed during the course of the reaction until the desired conversion of the conjugated diene to the 1,4-diene is obtained. One or both of the reactants can be charged to the reaction vessel, continuously or intermittently during the reaction. In a preferred process, ethylene is maintained at practically a constant pressure over the diene (which is usually in solution as discussed hereinafter), until consumption of ethylene ceases. The proportions of reactants used in a given reaction can be routinely determined by one skilled in the art.

The α-monoolefin/conjugated diene reaction can be carried out at about 25–150° C. At temperatures below about 50° C., the rate may be too slow for operating convenience. The preferred temperature range lies between 50° and 120° C., about 65–100° C. being particularly preferred for practical operation and good reaction rates.

The proportion of the catalyst in the monomer reaction zone can be varied widely. For economic reasons, it is desirable to use as little catalyst as possible consistent with a reasonable reaction rate; a lower limit being about .001 millimole of rhodium per mole of diene used.

A practical range of pressures for the reaction in generally available reactors is from about 1 atmosphere absolute to about 2000 p.s.i.g. In order to operate at temperatures at which product formation takes place at a convenient rate, it may be necessary to maintain superatmospheric pressure to liquify the diene and maintain a reasonable concentration of the α-monoolefin.

The reaction is usually carried out in an inert organic medium. For convenience the medium should boil in a range to allow easy isolation of the 1,4-diene. It should disperse the catalyst satisfactorily either by dissolving the chosen rhodium salt or a solution of the rhodium salt in a convenient solvent. Representative suitable media include: tetrachloroethylene, methylene chloride, chlorobenzene, aromatic hydrocarbons such as benzene and toluene; aliphatic and cycloaliphatic hydrocarbons such as hexane and decalin respectively; ethers and polyethers such as tetrahydrofuran, diethylene glycol dimethyl ether and ethoxy triethylene glycol. It is believed that any diluent useful for conducting the coordination catalyzed polymerization of hydrocarbon monomers can be used here. The conjugated diene itself, for example 1,3- butadiene, can serve as the medium.

The 1,4-diene can be prepared in a batch or continuous reactor. The reaction time is selected to carry out the desired conversion of 1,3-diene and can vary widely. Optionally the reaction is stopped by adding a minimal amount of an amine or phosphine or by cooling to 0° C. After the reaction has stopped, gasses are let off and the liquid directly distilled, the 1,4-diene being separated by fractionation. The reaction mixture which continually overflows from a continuous reaction zone is treated by suitable continuous or batch purification and fractionation procedures to yield the 1,4-diene, the catalyst being recycled for reuse when desired.

The process of this invention can be used to reactivate any rhodium catalyst which prior to deactivation catalyzes the α-monoolefin-conjugated diene reaction. In general, any rhodium (III) compound which can be solubilized under the reaction conditions and from which active catalyst species can be generated is suitable. A preferred active catalyst species is (CH₃—CH=CH—CH₂)₂Rh₂Cl₄
(CH₂=CH—CH=CH₂)

A preferred Rh (III) compound which can be converted to an active catalyst species by interaction with ethylene and butadiene is RhCl₃·3H₂O. The detailed mechanism of this conversion has been described by R. Cramer, J. Am. Chem. Soc. 89, 1633 (1967). Other Rh (III) compounds, such as [(CH₃—CH=CH—CH₂)₂RhCl]₂, Rh(acetylacetonate)₃, RhF₃·6H₂O, RhBr₃, Rh(CN)₃·3H₂O, Rh₂(SO₄)₃, RhI₃, Rh₂(CO₃)₃, and Rh(NO₃)₃, are operable when used with water and HCl in the presence of ethylene and butadiene.

Rhodium (I) salts will not catalyze the reaction; however, the activators of this invention will oxidize rhodium (I) to rhodium (III). Thus, rhodium (I) salts can be used provided an activator is also present as the rhodium (I) salts are oxidized in situ to an active species. Rhodium (I) can also, of course, be oxidized separately to rhodium (III) prior to introduction to the reaction vessel. Representative rhodium (I) salts which can be oxidized to an active catalyst species by the activators of this invention are diethylene rhodium monochloride

[(CH₂=CH₂)Rh₂Cl₂], (1,5-cyclooctadiene)₂Rh₂Cl₂, (CH₂=CH—CH=CH₂)₂RhCl (CH₂=CH₂)₂Rh(acetylacetonate) and 1,5-cyclooctadiene)Rh(acetylacetonate)

Further, when the Rh (I) compound

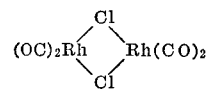

and water are used in the reaction mixture, said compound decomposes to give an active catalyst species for the monoolefin-diene codimerization reaction.

As the rhodium-catalyzed α-monoolefin-conjugated diene reaction proceeds, the rhodium catalyst becomes deactivated to the point that, eventually, 1,4-diene is no longer produced. If, however, the deactivated rhodium is treated with an activator as described below, the catalyst can be restored to nearly full activity.

The activators of this invention include chlorine and active organic halides (chlorides or bromides) that will not interfere with the catalytic reaction. A preferred class of activators has the formula CX₃Z where X is halogen, usually chlorine or bromine, and Z is a group such as

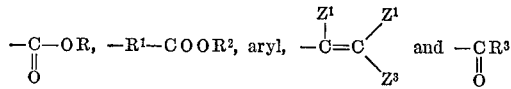

wherein R and R² represent hydrogen, alkyl, haloalkyl, aryl, haloaryl or alkaryl, R¹ represents alkylene; R³ is alkyl, haloalkyl, aryl, haloaryl, aralkyl or alkaryl; Z¹ is hydrogen, halogen, alkyl, haloalkyl, aryl or haloaryl and Z² and Z³ represent halogen, alkyl, haloalkyl, aryl or haloaryl.

Specific examples of activators described generically above include benzotrichloride, hexachloropropylene, CCl₃CH=CCl₂, Cl₂BrC—CCl=CCl₂, trichloroacetic acid,

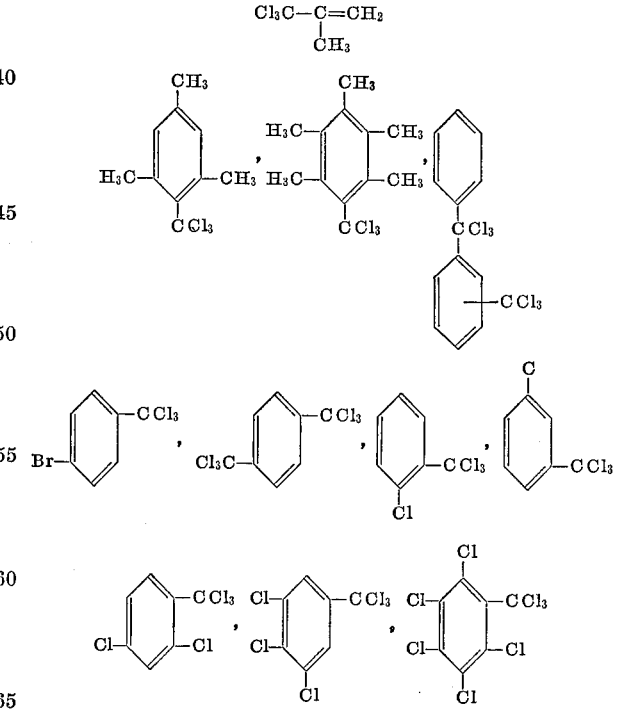

Other active organic halides include

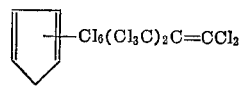

2-bromo-2-methylpropionyl bromide, bromoacetyl bromide, chloroacetyl chloride, trichloroacetyl chloride, trichloroacetic acid anhydride, allyl chloride, crotyl chloride, 2-chloro-1,3-butadiene, Q-CHBr-CH$_2$Br, QCHX$_2$,

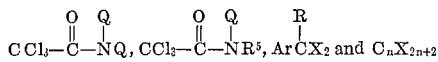

where $n$ is at least one, R is defined above, Q is aryl such as phenyl, naphthyl, etc., R$^5$ is alkyl, Ar is aryl, alkaryl or haloaryl and X is halogen such as Cl, Br or I.

Specific examples of the other active organic halides described generically above include carbon tetrabromide, carbon tetrachloride, 2,2,2-trichloro-N,N-diphenylacetamide,

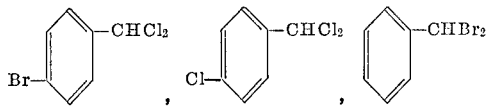

Another important class of active halide activators are the α-chloroethers of the formula

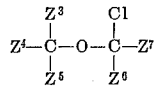

wherein Z$^4$, Z$^5$ and Z$^6$ are individually hydrogen, chlorine, C$_1$–C$_{12}$ alkyl, or substituted C$_1$–C$_{12}$ alkyl wherein the substituents are halo or alkoxy, and Z$^7$ and Z$^3$ are individually hydrogen or chlorine. Representative α-chloroethers are chloromethyl methyl ether, bis(chloromethyl) ether and bis(trichloromethyl) ether. The α-chloroethers should be used under anhydrous conditions; otherwise, HCl is generated in situ and causes corrosion.

It will be apparent from the above that in general the activators of this invention are compounds known in the art to contain "active" halogen atoms and which do not contain any substituents which interfere with the codimerization reaction. An active halogen, as is well understood by those skilled in the art, is a halogen atom attached to a carbon atom through a bond made weak or labile by a functional group also attached to said carbon atom, such as vinyl, a phenyl, a cyano or a carbonyl radical or an electronegative atom such as oxygen. Chlorine gas, however, is an exception to the above rule. Among the activators found most effective in reactivating the rhodium catalyst are benzotrichloride, allyl chloride, chloromethyl methyl ether, crotyl chloride, triphenylchloromethane and chlorine.

The activators are added in an amount such that there is about 1–500 gram-moles of activator per gram-atom of rhodium. Best results are achieved when about 50–200 gram moles of activator are used per gram-atom of rhodium.

The activators described above can be used to reactivate rhodium catalysts which have become deactivated in the synthesis of 1,4-dienes by both batch and continuous processes. At the completion of a batch run, the reactor is normally cooled to room temperature and the contents discharged; volatile products are then stripped. The crude product is separated from the catalyst residue by distillation. The catalyst residue which remains is usually in the form of rhodium compounds dissolved in high boiling liquids. The high boiling liquids are mixtures of oligomers formed as by-products during the catalytic reaction. This residue is then contacted with the necessary quantity of an activator. The resulting composition can be used as the catalyst for the next reaction run.

When a continuous process is used, the monoolefin and diene are continuously introduced into the reactor, reaction mixture is continuously withdrawn, the 1,4-diene product is separated by distillation and the resulting catalyst residue is treated with the activator and the treated catalyst residue is continuously returned to the reactor.

The activators can also be charged directly to the reactor with the catalyst or can be introduced as the reaction proceeds and the catalyst begins to lose its activity. When employed in this manner, the activator "preserves" or "maintains" catalyst activity, and the terms "activate" and "reactivate" as used herein are meant to include preservation of catalyst activity. In fact, best results are achieved when catalyst activity is preserved in this manner.

The activators of this invention are highly effective in restoring deactivated rhodium catalyst to activity. In fact, rhodium catalyst which has decayed to the point that it is ineffective in promoting the α-olefin-conjugated diene reaction can be substantially restored to activity by the process of this invention. A further advantage is that the highly corrosive methanol-HCl system of the prior art need not be used.

The invention is illustrated by the examples which follow wherein parts and percentages are by weight unless otherwise indicated.

Examples 1–9

General procedure.—A 2-liter stainless-steel or Hastelloy autoclave is charged with 1 liter of solvent containing 0.4 gram (2 millimoles) of diethylene Rh (I) monochloride under a protective atmosphere and cooled to about −35° C. 1,3-butadiene is distilled into the autoclave and condensed therein; the autoclave is then closed and heated to 68° C. Gaseous ethylene is introduced to saturate the liquid phase and establish the desired pressure. Before addition of the activator, the system is essentially inactive in synthesizing hexadiene as can be shown by periodical analysis of the reaction mixture. Injection of the activator such as benzotrichloride thereafter, however, causes active catalyst to form in situ and heat may be evolved causing a momentary temperature rise to about 72° C. The autoclave is subsequently cooled to 68° C. and kept there. The progress of the reaction is followed by vapor phase chromatographic analysis of liquid samples from the reactor; cyclohexane, present in the sample, is the internal standard.

1,4-hexadiene can be isolated by fractional distillation of the liquid phase remaining after gas has been vented from the reaction mixture. The C$_6$ fraction (material boiling up to 90° C. at atmospheric pressure) obtained includes 1,4-hexadiene, its isomerization product 2,4-hexadiene, and 3-methyl-1,3-pentadiene. Solvent is present in the next fraction.

| Example | Solvent | 1,3-butadiene (g.) | Pressure (p.s.i.) | Compound | Amount, (ml.) | Added— |
|---|---|---|---|---|---|---|
| 1 | Chlorobenzene | 198 | 130 | Benzotricholride | 40 | After Rh(I). |
| 2 | Toluene | 192 | 120 | Hexachloroacetone | 20 | Do. |
| 3 | do | 175 | 140 | Allylchloride | 10 | Do. |
| 4 | do | 190 | 140 | Triphenyl chloromethane | [1] 20 | Do. |
| 5 | do | 179 | 140 | 2-chloro-1,3-butadiene | 20 | Do. |
| 6a | do | 184 | 140 | α,α,α-trichloro-N,N-diethyl-acetamide | 20 | Do. |
| 6b | | | 140 | | 20 | 2 hrs. later than 6a. |
| 7 | Toluene | 176 | 130–140 | Benzotrichloride | 20 | After Rh(I). |
| 8 | do | 176 | 140 | do | 20 | Do. |
| 9 | do | 176 | 140 | do | 20 | Do. |

[1] Grams.

In Examples 3–9 a compound as indicated below is added before the 1,3-butadiene to raise the value of the trans-cis 1,4-hexadiene isomer ratio. In Example 6 the activator used can serve additionally to raise the trans-cis ratio.

| Example | Compound | Amount, ml. |
|---|---|---|
| 3,4,5 | N,N-dimethylacetamide | 20 |
| 6 | α,α,α-trichloro-N,N-dimethylacetamide | 40 |
| 7 | Hexamethylphosphoradmie | 20 |
| 8 | Dimethylformamide | 20 |
| 9 | Tri-n-butylphosphine oxide | [1] 20 |

[1] Grams.

Results are given in the following table.

TABLE

| Example | Activator | Reaction time | 1,4-hexadiene produced Grams | Trans/cis ratio |
|---|---|---|---|---|
| Control | None | 90 min | 0 | |
| 1 | φCCl₃ | 30 min | 20 | 7 |
| | | 1 hr | 40 | 6.6 |
| 2 | Cl₃C—C(O)—CCl₃ | 2 hrs | 82 | 5 |
| 3 | CH₂=CH—CH₂Cl | 30 min | 44 | 14 |
| | | 1 hr | 84 | 15 |
| | | 2 hrs | 107 | 13 |
| 4 | φ₃CCl | 1 hr | 173 | 60 |
| | | 2 hrs | 7 | 30 |
| | | 3 hrs | 24 | 20–30 |
| 5 | CH₂=C(Cl)—CH=CH₂ | 4 hrs | 36 | 25 |
| | | 6 hrs | 68 | 18 |
| 6 | Cl₃CPO N(CH₃CH₂)₂ | 1 hr | 7 | 12 |
| | | 2 hrs | 24 | 12 |
| | | 3 hrs | 36 | 11 |
| | | 4 hrs | 51 | 9 |
| 7 | φCCl₃ | 4 hrs | 93 | 40 |
| 8 | φCCl₃ | 2 hrs | 112 | 30 |
| 9 | φCCl₃ | 1 hr | 12 | (¹) |
| | | 2 hrs | 31 | (¹) |
| | | 3 hrs | 52 | 70 |

¹ Pure trans.
NOTE: φ=Phenyl.

Example 10

Use of an activator to preserve catalytic activity.—The general procedure of Examples 1–9 is observed. The initial reaction mixture contains 0.4 g. (C₂H₄)₂RhCl, 20 ml. N',N'-dimethylacetamide (DMAC), 20 ml. benzotrichloride, 20 ml. cyclohexane, 1 liter toluene, 170 g. 1,3-butadiene and ethylene sufficient to generate 140 p.s.i. at 68° C. After 2 hours of reaction the reactor is cooled to room temperature and the reaction mixture distilled at 25–35° C. until a residual liquid of about 100 ml. remains. The residual liquid is diluted again by 1 liter of toluene, and put back into the reactor. 1,3-butadiene and ethylene are added as described in the previous example and the synthesis of 1,4-hexadiene proceeds. The recyclization process is repeated four times without significant loss of catalytic activity as demonstrated in the following table:

| Cycle: | 1,4-hexadiene (grams) | Trans-cis ratio |
|---|---|---|
| 1 | 95 | >30 |
| 2 | 84 | >30 |
| 3 | 86 | >30 |
| 4 | 91 | >30 |

In the absence of activator the Rh catalyst loses its activity rapidly as is illustrated by Example 11.

Example 11

Use of activator to revive catalyst activity.—The general procedure of Example 10 is followed except for the following changes. Diethylene Rh (I) chloride is replaced by 0.5 g. rhodium trichloride trihydrate (dissolved in 20 ml. MeOH) which is introduced into the reactor after all the monomers have been introduced. No activator is present. Two hours after the reaction begins the reactor is cooled and the same type of catalyst recyclization operation as was used in Example 10 is repeated. Benzotrichloride and DMAC are added in the third cycle. Results are as follows:

| Reactivators added | 1,4-hexadiene, grams | Trans-cis |
|---|---|---|
| Cycle) | | |
| 1 ——— None | 120 | 13 |
| 2 ——— None* | 30 | 13 |
| 3 ——— 20 ml. φCCl₃ plus 20 ml. DMAC | 110 | 12 |

*20 ml. of fresh MeOH was added to replace the initial quantity removed the recyclization process.

What is claimed is:

1. A process for activating a rhodium catalyst which has been deactivated through use in preparing 1,4-dienes by codimerizing α-monoolefins and conjugated dienes, which process consists essentially of contacting said rhodium catalyst in situ during the α-monoolefindiene reaction or contacting said deactivated rhodium catalyst with about 1–500 gram-moles per gram-atom of rhodium catalyst, of chlorine, carbon tetrachloride, carbon tetrabromide or an active organic chloride or bromide compound containing a chlorine or bromine atom attached to a carbon atom, said carbon atom also having attached thereto a vinyl, substituted vinyl, phenyl, substituted phenyl, cyano or carbonyl radical or an α-chloroether oxygen atom.

2. A process of claim 1 wherein the activator is an active organic halide.

3. A process of claim 1 wherein the activator is chlorine.

4. A process of claim 1 wherein the activator is benzotrichloride, allyl chloride, crotyl chloride, chloromethyl methyl ether, or triphenylchloromethane.

5. A process of claim 1 wherein the activator is benzotrichloride.

6. A process of claim 1 wherein the activator is chloromethyl methyl ether.

7. A process of claim 1 wherein the activator is an admixture with the rhodium catalyst during the α-monoolefin-conjugated diene reaction.

8. A process of claim 1 wherein the activator is used in the amount of about 50–200 gram-moles per gram-atom of rhodium.

9. A process of claim 1 wherein the active catalyst is dervied from rhodium (III) trichloride trihydrate, crotyl rhodium (III) dichloride butadiene complex or diethylene rhodium (I) chloride and the activator is benzotrichloride, allyl chloride or crotyl chloride.

10. A process of claim 1 wherein the active catalyst is derived from rhodium (III) trichloride trihydrate and the activator is benzotrichloride.

11. A process of claim 10 wherein the activator is used in the amount of about 50–200 gram-moles per gram-atom of rhodium.

12. A process of claim 1 wherein the activator is a compound having the formula $CX_3Z$ wherein X is chlorine or bromine and Z is an aryl group.

References Cited

UNITED STATES PATENTS 3,013,066  12/1961  Alderson ———— 260—683.15
3,152,195  10/1964  Verbahc ———— 260—680
3,502,738  3/1970   Cramer ———— 260—680

DANIEL E. WYMAN, Primary Examiner

P. E. KONOPKA, Assistant Examiner

U.S. Cl. X.R.

23—87, 203, 315; 260—429, 680; 252—441